Figure 1:
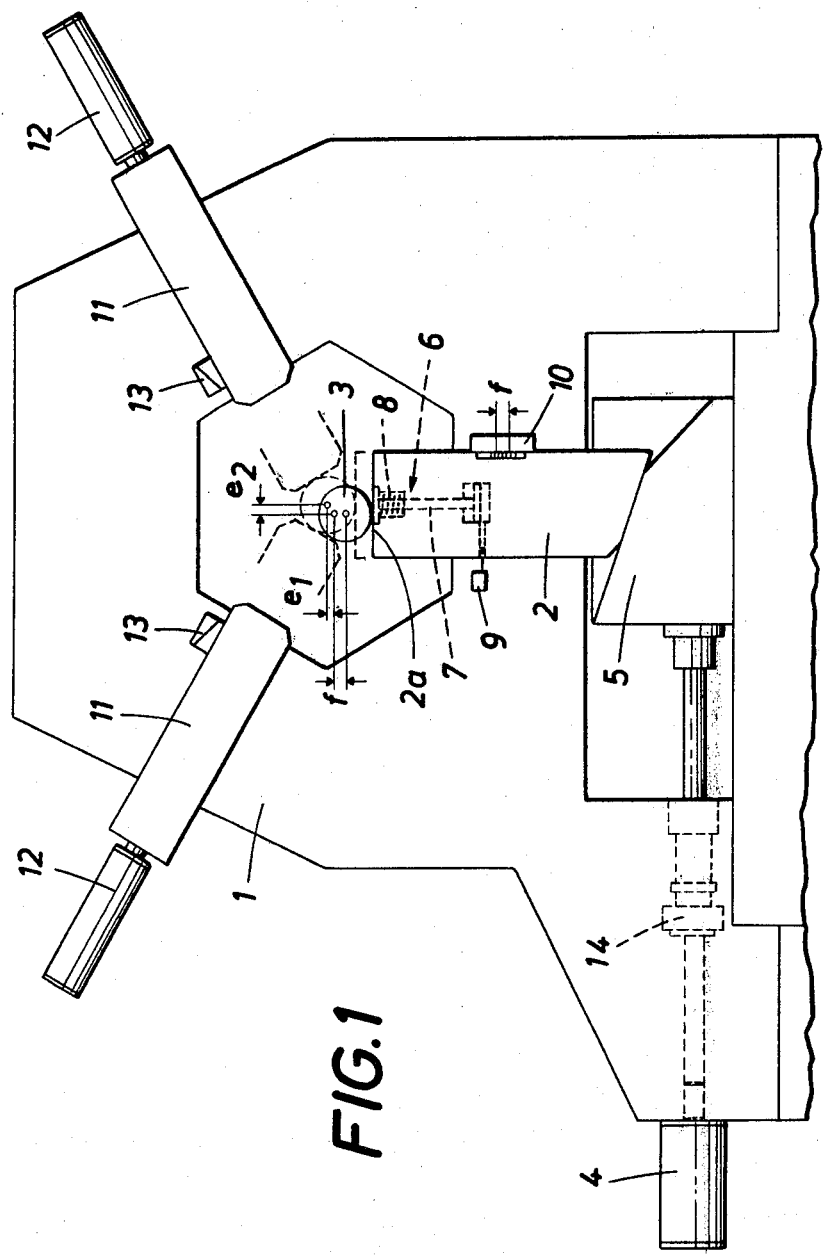

United States Patent [19]

Blaimschein

[11] 4,388,027
[45] Jun. 14, 1983

[54] PROCESS FOR MILLING LONG WORKPIECES

[75] Inventor: Gottfried Blaimschein, Steyr, Austria

[73] Assignee: GFM Gesellschaft fur Fertigungstechnik und Maschinenbau Gesellschaft m.b.H., Steyr, Austria

[21] Appl. No.: 186,112

[22] Filed: Sep. 11, 1980

[30] Foreign Application Priority Data

Oct. 16, 1979 [AT] Austria ................................ 6722/79

[51] Int. Cl.³ ........................... B23B 5/18; B23C 3/06
[52] U.S. Cl. ........................................ 409/131; 82/9; 82/39; 82/45; 409/199
[58] Field of Search .............. 409/131, 132, 199, 200; 82/39, 45, 1 C, 9; 51/238 S, 326; 29/6

[56] References Cited

U.S. PATENT DOCUMENTS

| | | | |
|---|---|---|---|
| 2,290,324 | 7/1942 | Groene et al. | 29/6 |
| 2,567,685 | 9/1951 | Allen, Jr. | 29/6 |
| 2,650,522 | 9/1953 | Godfriaux | 82/39 X |
| 2,737,760 | 3/1956 | Healy | 82/39 X |
| 2,737,762 | 3/1956 | Berry et al. | 82/39 X |
| 3,590,469 | 7/1971 | Rohs | 29/6 X |
| 4,180,947 | 1/1980 | Schmidt et al. | 51/326 |

FOREIGN PATENT DOCUMENTS 978434 12/1964 United Kingdom ................... 82/39

Primary Examiner—Z. R. Bilinsky
Attorney, Agent, or Firm—Kurt Kelman

[57] ABSTRACT

A distorted workpiece is initially held in a position in which it has a free sag near the center of its length. The distorted workpiece is subsequently supported near the center of its length so as to eliminate only the elastic deformation of the workpiece which is due to the free sag.

5 Claims, 3 Drawing Figures

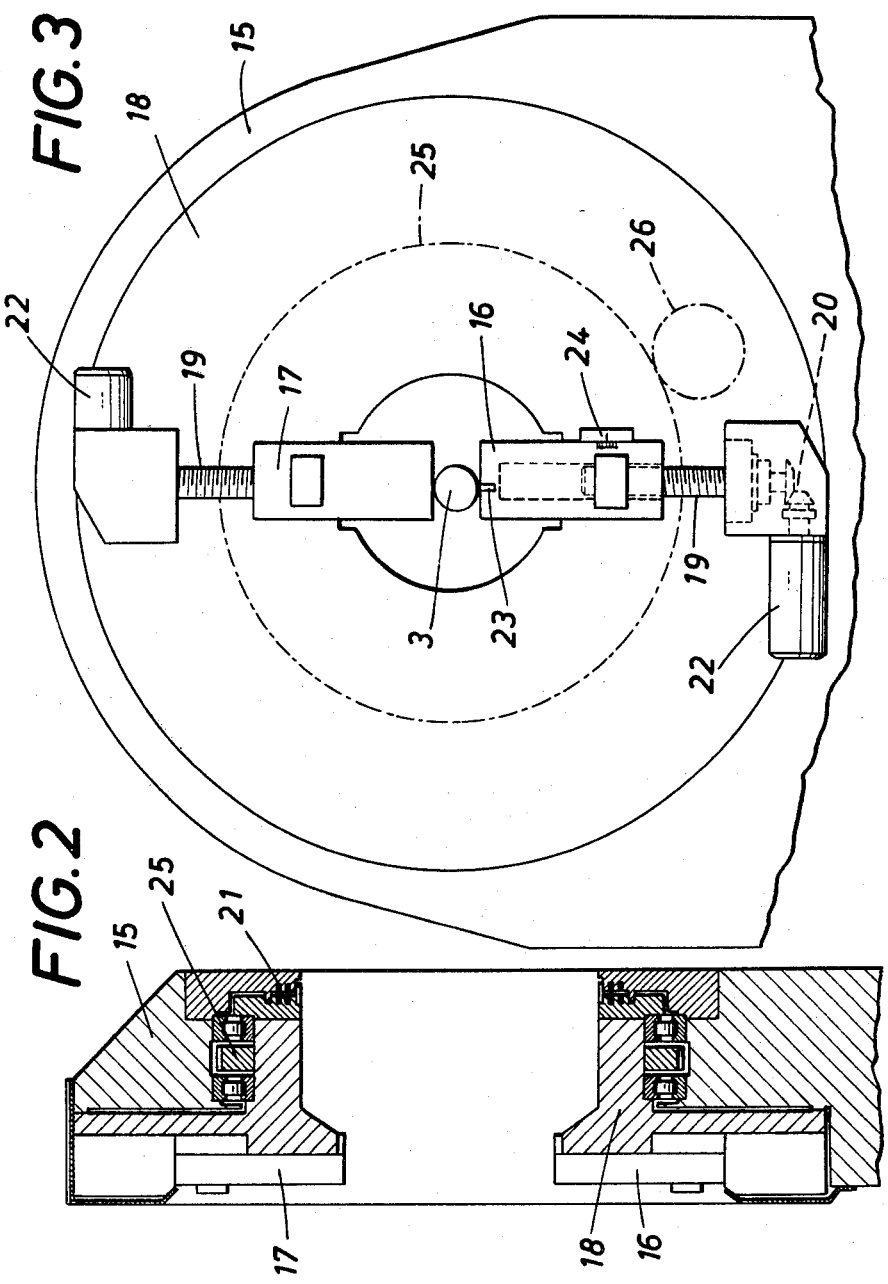

PROCESS FOR MILLING LONG WORKPIECES

This invention relates to a process of milling long workpieces, particularly crankshafts, wherein the workpiece is supported near the center of its length as it is machined, the workpiece being roughended in a preliminary machining operation and finish-machined in a succeeding machining operation.

A workpiece to be machined first at the ends, particularly a long workpiece, must be supported near the center of its length so that the workpiece can be centered and vibration can be avoided. This is particularly important when small tolerances are required, as is the case with crankshafts and camshafts. As such workpieces are supported by backrests or supporting rollers, the workpiece must be provided by a separate turning operation on a lathe with a rib for engaging the backrest so that the workpiece can be properly centered. Large crankshafts having a length of 2 to 3 meters or more must be machined in two operations at the mainshaft portions and at the crankpins before they can be ground. The first of these operations consists of a preliminary roughing operation and the second operation consists of a succeeding finish-machining operation. The roughing operation causes inherent stresses in the material to be released so that the crankshaft or other workpiece will be distorted. Conventionally, the workpiece is supported by a centering backrest which engages the workpiece at the rib provided for this purpose or at a previously milled mainshaft portion, and the workpiece will be traightened by the backrest and will be machined in this straight condition. But when the backrest is subsequently opened, the crankshaft or other workpiece will spring back to the distorted position and must then be straightened in a complicated operation by a press. That straightening operation is very expensive because it cannot be automatically controlled. When such a straightening operation cannot be performed, the grinding allowance must be so large that the distortion of the shaft is eliminated by grinding. But the removal of such allowances by grinding is very time-consuming and requires a grinding machine which meets very high requirements.

For this reason it is an object of the invention to eliminate these disadvantages and to provide a process for milling long workpieces, particularly crankshafts, wherein a turning operation for providing a rib for engagement by a backrest is not required, and even though a straightening operation is not performed, the milled workpiece will be virtually undistorted, and the workpiece can be machined to particularly small tolerances.

In the process according to the invention, this object is accomplished in that the workpiece to be machined is supported in such a manner that any plastic deformation of the workpiece which is due to the release of internal stresses in the material as a result of a preceding machining step is maintained and the supporting means are used only to eliminate the elastic sag of the workpiece at the point where it is supported, which sag is ascertained empirically and/or by calculation.

Because the workpiece is no longer clamped to center the workpiece, the need for a turning operation for forming the workpiece with a rib for engagement by the backrest is eliminated because a mainshaft portion which has not yet been machined is sufficient for the elimination of the free sag, which is due to the weight of the workpiece. Any occurring inaccuracies are not significant because they are eliminated by the removal of material during the succeeding milling operation. This is particularly true for the finish-machining operation, during which the support does not raise the workpiece to the center of the machine and does not center the workpiece but again eliminates only the free sag, i.e., that portion of the distortion which is due to the weight of the workpiece, whereas the curvature which has been caused by the inherent stresses during the roughing operation and any downward deflection will be maintained. When only the free sag, which is due to the weight of the workpiece, has been eliminated, the workpiece is held in a curved position and is machined in that position. As a result, the entire distortion resulting from the roughing operation is eliminated by the removal of material during the finish-machining operation. As the finish-milling operation removes only a small amount of material so that additional stresses are hardly released, the crankshaft or other workpiece will not exhibit a substantial further distortion and close tolerances will be ensured. Besides, there is no need to straighten the workpiece before the grinding operation, the grinding allowance can be minimized and the grinding time is greatly shortened. The process according to the invention may be used for milling operations in which the workpiece is stationary or rotated because it is sufficient to support the workpiece so as to eliminate the free sag which is due to the weight of the workpiece. This can be effected when the workpiece is stationary or rotating.

This process can be carried out in a simple, efficient manner by a suitable milling machine which is provided with a backrest which may comprise two individually adjustable gripping jaws, one of which constitutes a supporting jaw adapted to the vertically raised into engagement with the workpiece, whereas the other jaw constitutes a retaining jaw engageable with the workpiece from above to clamp the workpiece against the supporting jaw. The supporting jaw is provided with a detector for indicating the position of initial contact of the supporting jaw with the workpiece, a positioning drive is associated with the supporting jaw and operable to raise the supporting jaw from that position of initial contact to a preselectable extent, and the retaining jaw is adapted to cooperate with the raised supporting jaw. With the aid of such backrest, the sag of the shaft, which sag can be determined empirically or by calculation, can be eliminated without difficulty because this can be accomplished by imparting to the supporting jaw an additional upward movement which corresponds to the extent of said sag. The additional upward movement can be initiated in any desired manner, e.g., by hand, by means of cams, decade switches, punched tape and the like. When the selected additional upward movement has been performed by the supporting jaw, the latter is locked in position. Thereafter, the retaining jaw—it will be understood that two or more retaining jaws may be provided—must be engaged with the workpiece to clamp the latter against the supporting jaw. It is apparent that such a backrest can be operated fully automatically. Besides, the backrest can grip directly the as-forged mainshaft portion so that it is no longer necessary to form the workpiece before the preliminary machining operation with a rib for engagement by the backrest by a turning operation.

Because it is important to determine the position of the point of contact between the jaw and the supporting jaw and the workpiece accurately, the detector comprises in accordance with the invention a feeler which protrudes from the supporting surface of the supporting jaw and is adapted to be depressed against a spring bias to trigger a control signal when the sensor is flush with the supporting surface. As the supporting jaw is moved toward the workpiece, that feeler is depressed into the supporting surface of the supporting jaw against the spring bias and will be exactly flush with the supporting surface when the latter contacts the workpiece. As soon as this position has been reached, a suitable signal generator generates a signal, which indicates that the movement of the supporting jaw must now be continued for a distance corresponding to the free sag.

It will also be desirable to provide the drives for positioning the jaws with brakes or to provide the jaws themselves with locking means. By means of the brakes for the positioning drives, the displacement of the jaws can be exactly controlled and the jaws can be locked in any desired position. It will be understood that the latter effect can also be obtained by separate means for clamping the jaws. When the jaws have thus been locked, the workpiece will be clamped in the desired position for the succeeding machining operation without a loading of the positioning drives.

When it is desired to support a workpiece which is rotated as it is machined, the gripping jaws and their positioning drives are mounted in a carrying ring which surrounds the workpiece and is rotatably mounted and adapted to be arrested in datum rotational position, in which the supporting jaw extends vertically upwardly. The carrying ring can easily be moved to said datum rotational position under the control of control switches. When the carrying ring is in said position, the supporting jaw can be engaged with the workpiece from underneath, as is desired, and can force the workpiece upwardly so as to eliminate the free sag. When the workpiece has been fixed in this position by the retaining jaw, the carrying ring can then be rotated during the machining of the workpiece whereas the gripping is maintained.

Embodiments of the invention are shown by way of example on the accompanying drawings, in which FIG. 1 is an end elevation showing a backrest according to the invention for use in a milling machine for machining a workpiece while the latter is stationary and FIGS. 2 and 3 are, respectively, a transverse sectional view and an end elevation showing a backrest for use in a milling machine for machining a workpiece while the latter is rotated.

The backrest 1 shown in FIG. 1 comprises a supporting jaw which is vertically guided and is adapted to be engaged with a workpiece 3 from underneath. The drive 4 for positioning supporting jaw 2 cooperates with a wedge mechanism 5 and is operable to lift the jaw 2 to a preselectable extent above the position in which the jaw 2 has initially contacted the workpiece. The position in which the supporting jaw 2 initially contacts the workpiece is indicated by a detector 6 which comprises a feeler 7 biased by a spring 8 to protrude above the supporting surface 2a of the supporting jaw 2 to cause a pulse generator 9 to generate a signal as soon as the feeler 7 is flush with the supporting surface 2a, which means that the supporting jaw 2 is in the position of initial contact with the workpiece. The movement of the supporting jaw 2 is then continued for a predetermined extent above said position of initial contact. That extent equals the free sag of the workpiece at the point where it is supported. The displacement of the supporting jaw 2 can be checked by a displacement-measuring instrument 10.

Two retaining jaws 11 cooperate with the supporting jaw 2 to clamp the workpiece against the supporting jaw 2. A separate positioning drive 12 is associated with each retaining jaw 11. To permit the jaws to be locked in their gripping position, the retaining jaws 11 are provided with locking means 13 and the drive 4 for positioning the supporting jaw 2 comprises a brake 14.

To eliminate the need for a turning operation for forming a rib for engagement by the backrest and to ensure that the distortion of the workpiece due to the release of inherent stresses during the preliminary machining operation can be eliminated by the succeeding machining operation, the workpiece 3 which is to be machined or which has been subjected to the preliminary machining operation and is to be machined further is supported by the backrest 1. The latter engages the raw mainshaft portion and acts to eliminate only the free sag of the workpiece whereas the inaccuracy which is due to the absence of a rib engageable by the backrest or the distortion that is due to the preliminary machining operation is maintained. For this purpose the supporting jaw 2 of the backrest 1 is moved toward the workpiece 3 from below to the position of initial contact of the supporting jaw with the workpiece; this position is indicated in solid lines in FIG. 1. From this position of initial contact, the supporting jaw 2 is raised further so as to raise the workpiece 3 by a distance f, which corresponds to the free sag but does not take into account the curvature that is due to the preliminary machining operation and is indicated by the eccentricities $e_1$, $e_2$. The supporting jaw 2 is fixed in the resulting position by the brake 14. The workpiece 3 is then held clamped by the retaining jaws 11 (position shown in dotted lines in FIG. 1). This clamping of the shaft in a position in which only the sag of the shaft is eliminated whereas the shaft is still a distorted state will eliminate the need for a turning operation to form the shaft with a rib that is engageable by the backrest and permits the undesired distortion to be eliminated by the succeeding machining step. As a result, the workpiece need not be straightened before the subsequent grinding operation and close tolerances can be adhered to without a need for a large grinding allowance. The extent of the sag is ascertained empirically or by calculation and provides a preselected extent by which the supporting jaw 2 must be raised from the position of initial contact of the supporting jaw with the workpiece. The raising movement can be monitored by the displacement-measuring instrument 10.

When it is desired to machine a workpiece 3 as it is rotated, a backrest having rotatable gripping jaws must be used. Such backrest 15 is shown in FIG. 2 with open jaws and in FIG. 3 with the jaws in gripping position. In this case a supporting jaw 16 and a retaining jaw 17 are mounted in a carrying ring 18 and extend radially therein and are adjustable by means of a screw 19, bevel gears 20 and an electric motor 22, which is adapted to be fed via slip ring contacts 21. The supporting jaw 16 is again provided with a detector 23 for indicating the position of initial contact between the jaw 16 and the workpiece 3. A displacement-measuring instrument 24 serves to monitor the displacement of the jaw. The carrying ring 18 is rotatably mounted in the backrest 15 so that the jaws 16, 17 which grip the workpiece 3 can rotated with the workpiece as it is machined. In order to support the workpiece 3 in a position in which the free sag is eliminated but the distortion of the workpiece is maintained, a datum rotational position is defined for the carrying ring 18. In that datum position, the supporting jaw 16 is adapted to be vertically raised into engagement with the workpiece and to force the workpiece upwardly to an extent that is equal to the free sag. When the supporting jaw 16 has reached its final position, the retaining jaw 17 is lowered to grip the workpiece 3. For a machining of the workpiece 3 as it is rotated, the carrying ring 18 can now be rotated by means of a drive gear 25 and a pinion 26, and the gripping jaws 16, 17 and the drives for positioning them will follow that rotation.

What is claimed is:

1. In a process of subjecting a long workpiece to a preliminary rough-milling operation causing distortion of the long workpiece by a plastic deformation and a subsequent finish-milling operation while supporting the workpiece near the center of its length, the improvement of (a) initially holding the rough-milled workpiece in a position wherein it has a free sag near the center of its length, the free sag causing an elastic deformation of the long workpiece (b) determining the extent of the free sag, and (c) supporting the workpiece near the center of its length sufficiently to eliminate solely the elastic deformation and without eliminating the distortion of the long workpiece while finish-milling the workpiece.

2. In the process of claim 1, the workpiece being a crankshaft.

3. In the process of claim 1 or 2, the rough-milling causing internal stresses in the material of the workpiece to be released to cause the distortion by plastic deformation.

4. In the process of claim 1, 2 or 3, the extent of the free sag being determined empirically.

5. In the process of claim 1, 2 or 3, the extent of the free sag being determined by calculation.

* * * * *